United States Patent [19]

Martin

[11] Patent Number: 4,492,327

[45] Date of Patent: Jan. 8, 1985

[54] TUBE PULLING APPARATUS

[75] Inventor: Gregory W. Martin, Rochester, N.Y.

[73] Assignee: Carrier Corporation, Syracuse, N.Y.

[21] Appl. No.: 303,796

[22] Filed: Sep. 21, 1981

[51] Int. Cl.³ .............................................. B65H 17/20
[52] U.S. Cl. .................................... 226/177; 226/188; 226/193; 29/244
[58] Field of Search ............... 226/168, 174, 176, 177, 226/190, 193, 188; 254/29 R, 30; 29/252, 234, 237, 240, 244, 726, 727

[56] References Cited

U.S. PATENT DOCUMENTS

| 644,884 | 3/1900 | Wrigley | 254/29 R |
|---|---|---|---|
| 1,811,666 | 12/1929 | Foster . | |
| 2,316,117 | 4/1943 | Tilley | 226/177 X |
| 2,525,590 | 10/1950 | Collins | 226/177 |
| 2,576,203 | 9/1949 | Wilson | 81/57 |
| 3,014,628 | 12/1961 | Littlehale | 226/177 |
| 3,093,284 | 6/1963 | Mullin | 226/176 |
| 3,371,770 | 3/1968 | Graham et al. | 226/176 X |
| 3,465,941 | 9/1969 | Fournier | 226/177 |
| 3,565,310 | 2/1971 | Hugonin | 226/176 X |
| 3,679,115 | 7/1972 | Stock | 226/177 |
| 3,774,481 | 1/1971 | Goodman | 81/57.13 |
| 3,800,582 | 3/1972 | Sartori | 72/78 |
| 4,044,444 | 2/1976 | Harris | 29/727 |

FOREIGN PATENT DOCUMENTS

548269  3/1932  Fed. Rep. of Germany ...... 226/176

Primary Examiner—Frederick R. Schmidt
Assistant Examiner—Steven P. Schad
Attorney, Agent, or Firm—Robert P. Hayter

[57] ABSTRACT

A tube pulling apparatus is made up of a frame for receiving a tube, a pair of arm assemblies movably supported by the frame, and a pair of tube gripping assemblies rotatably supported by the arm assemblies and carried by the arm assemblies for movement into and out of engagement with the tube. The tube pulling assembly further comprises motive apparatus connected to each of the arm assemblies for moving the arm assemblies to move the tube gripping assemblies into engagement with the tube, and a spring is connected to the arm assemblies for biasing and urging the arm assemblies to move the tube gripping assemblies out of engagement with the tube. A drive assembly is connected to the tube gripping assemblies for rotating the tube gripping assemblies to pull the tube.

3 Claims, 5 Drawing Figures

TUBE PULLING APPARATUS

BACKGROUND OF THE INVENTION

This invention relates to apparatus for pulling tubes from tube sheets.

Many heat exchangers comprise a pair of parallel tube sheets, a plurality of baffle plates, and a multitude of heat exchange tubes. The tube sheets are located at the ends of the heat exchanger; the baffle plates are positioned between the tube sheets, generally parallel thereto; and the heat exchange tubes extend between the tube sheets, through the baffle plates, and are supported by the tube sheets. The tube sheets and baffle plates have a series of aligned holes formed therein, and the heat exchange tubes are inserted through these holes and then expanded in the areas of the tube sheets into pressure contact therewith. This pressure contact securely holds the tubes in position and forms a fluid tight seal between the tube sheets and the tubes. In operation, a first heat transfer fluid such as water is conducted through the tubes between the tube sheets, and a second heat transfer fluid having a temperature different than that of the first heat transfer fluid is conducted past the exterior of the tubes between the tube sheets, indirectly transferring heat between the two heat transfer fluids.

At times, due to malfunctions or normal maintenance, it is necessary to remove one or even all of the tubes used in a heat exchanger of the general type described above. Commonly this is done by first relieving the pressure forces between the tubes and the tube sheets and then longitudinally pulling the tubes through the baffle plates and the tube sheets. Manually pulling the tubes through the baffle plates and the tube sheets is often a difficult, time consuming task since the tubes in some heat exchangers may have length of up to 70 feet and be of considerable weight. Consequently, attention has been directed to designing machines for pulling the tubes from heat exchangers of the type discussed above.

Ideally, a mechanical tube pulling apparatus should meet or satisfy a number of goals. For example, it is desirable that the apparatus be able to twist or to rotate a tube about its longitudinal axis as the tube is pulled through a heat exchanger. More specifically, during normal operation of the heat exchanger, corrosion and other particulates or debris accumulate on the exterior surfaces of the heat transfer tubes. As a tube is pulled through the baffle plates and the tube sheets of the heat exchanger, these particulates may jam between the tube and the baffle plates or tube sheets, retarding or possibly stopping movement of the tube. Usually, by slightly rotating or twisting the tube about its longitudinal axis as the tube is pulled through the baffle plates and the tube sheets, these particulates or debris may be broken off from the tube surface, effectively preventing the particulates from jamming tube movements.

In addition, it is preferable that the tube pulling apparatus be employable with tubes of various diameters and of various styles, and that the apparatus be able to develop different tube gripping pressures, resulting in a very flexible and highly adaptable apparatus. Further, it is desirable to maximize the number of steps or operations performed by the tube pulling apparatus itself, minimizing the amount of human labor needed to pull the tubes from the heat exchanger. Finally, of course, it is desirable to keep the design, construction, and operation of the tube pulling apparatus relatively simple and to minimize the number of parts or elements of the apparatus to insure reliability as well as to minimize manufacturing, operating, and maintenance costs.

SUMMARY OF THE INVENTION

In view of the above, an object of the present invention is to grip a tube mechanically with a tube pulling apparatus.

Another object of this invention is to provide a tube pulling apparatus which may be used to pull tubes of different sizes and styles and which may selectively develop various tube gripping pressures.

A further object of the present invention is to rotate a tube about its longitudinal axis while the tube is pulled from a heat exchanger.

These and other objectives are attained with a tube pulling apparatus comprising a frame for receiving a tube, an arm assembly movably supported by the frame, and a tube gripping assembly rotatably supported by the arm assembly and carried by the arm assembly for movement into and out of engagement with the tube. The tube pulling apparatus further comprises motive means connected to the arm assembly for moving the arm assembly to move the tube gripping assembly into engagement with the tube, and biasing means also connected to the arm assembly and urging the arm assembly to move the tube gripping assembly out of engagement with the tube. A drive assembly is connected to the tube gripping assembly for rotating the tube gripping assembly to pull the tube.

A DETAILED DESCRIPTION OF THE PREFERRED EMBODIMENT

The drawings illustrate various views of tube pulling apparatus 10 constructed in accordance with a preferred embodiment of the present invention. Tube pulling apparatus 10 generally comprises frame 12, arm assembly 14, tube gripping assembly 16, motive means such as expansible cylinders 20, biasing means such as springs 22, and drive assembly 24. More specifically, preferably frame 12 includes a pair of side members 26, front member 30, upper and lower cross bars 32 and 34, top cover plates 36 and 40, and bottom cover plate 42. Arm assembly 14 comprises a pair of pivot pins 44 and a pair of pivot arms 46, and tube gripping assembly 16 includes a pair of roller pins 50 and a pair of gripping rollers 52. Drive assembly 24 comprises a pair of drive gears 54, a pair of driven gears 56, and connector 60 (shown in FIG. 5). Preferably, drive assembly 24 further comprises drive gear support means 62, driven gear support means 64, a pair of driven gear keys 66 (shown in FIG. 4), and drive gear key 70.

Discussing frame 12 in greater detail, the frame provides the basic support for the other elements of tube pulling apparatus 10, and the frame forms a cover or housing to protect the various elements or parts located therein from dirt, debris and other foreign objects. Side members 26 of frame 12 are rectangularly shaped and substantially identical; and the side members are positioned parallel to, opposite, and spaced from each other. Front member 30 is secured to and transversely extends between the front ends of side members 26, and the front member defines opening 72 (shown only in FIG. 3). Opening 72 and the volume of space within frame 12 and extending directly rearward from opening 72 comprise throat 74 for receiving a tube and through which the tube is pulled by tube pulling apparatus 10. Preferably, opening 72 is circular and is located in the center of front member 30. Further, cylindrical nose piece 76 may be secured to front member 30 to define a forward, tubular passage leading to, concentric with, and having approximately the same diameter as opening 72, thus assisting properly positioning a tube therein. Preferably nose piece 76 is releasably secured to front frame member 30 so that the nose piece may be replaced by a larger or smaller nose piece to facilitate using tube pulling apparatus 10 with heat exchange tubes of different sizes.

Cross bars 32 and 34 are also both rectangularly shaped and are substantially identical to each other. Cross bars 32 and 34 are secured to and transversely extend between back portions of side members 26, perpendicular thereto; with cross bar 32 located directly above, parallel to, and spaced from cross bar 34. Top plates 36 and 40 (omitted from FIG. 1) are secured to and transversely extend between top surfaces of side members 26, with plate 36 extending between top cross bar 32 and front member 30, and plate 40 extending rearward from the top cross bar. Plates 36 and 40 and top cross bar 32 thus cover the top of frame 12. Preferably, the top rear plate 40 is releasably held in place so that this plate may be easily removed to assist assembling, cleaning, and maintaining the various elements of apparatus 10 located within frame 12.

Bottom plate 42 is secured to and transversely extends between bottom surfaces of side members 26, covering the bottom of frame 12. Top and bottom plate 40 and 42 also project downward and upward respectively immediately behind side members 26, partially covering the back of frame 12. It should be noted, however, that the vertically extending rear portions of top and bottom plates 40 and 42 define an opening or are spaced apart to allow a tube to pass therethrough. Preferably, a pair of handles 80 are connected to frame 12, for example via back flanges 82, and project rearward of the frame to help a worker grasp, hold, and maneuver tube pulling apparatus 10. In addition, eye-bolt 84 (shown in FIG. 5) may be secured to the top of frame 12, specifically to the top of cross bar 32, and extend upward therefrom. Eye-bolt 84 may be used to connect frame 12 to a cable supported by an overhead crane or connected to a counterweight to assist handling, moving and aligning tube pulling apparatus 10.

Arm assembly 14 is movably supported by frame 12, and as indicated above, the arm assembly preferably includes pivot pins 44 and pivot arms 46. Pivot pins 44 are supported by frame 12 and define pivot axes, and pivot arms 46 are supported for pivotal movement about these pivot axes, which preferably are defined by the central, longitudinal axes of the pivot pins.

More particularly, cross bars 32 and 34 of frame 12 define aligned apertures 86 and 90, a back portion of each pivot arm 46 defines an aperture 92, and the pivot arms are positioned with the back portion thereof between cross bars 32 and 34, with apertures 92 aligned with apertures 86 and 90. Pins 44 axially extend through apertures 86, 90 and 92, allowing the pivot arms 46 to move about the axes of the pivot pins, but limiting radial and tangential movement of the pivot arms relative to the pivot pins.

With the preferred embodiment of arm assembly 14 illustrated in the drawings, pivot pins 44 are rotatably supported by frame 12, for example by washers 94 and snap rings 96. Washers 94 encircle upper portions of pivot pins 44 and rest on the top surface of cross bar 32, wherein the washers are supported by the cross bar and may rotate about the axes of the pivot pins. Snap rings 96 are secured or fitted into annular grooves defined by the upper portions of pivot pins 44, extend radially outward therefrom, and rest on washers 94, wherein the snap rings and the pivot pins are supported by the washers and may rotate about the axes of the pivot pins.

Bushings 100 may be fitted within apertures 86, 90 and 92, radially between the surfaces defining these apertures and pivot pins 44 to assist relative rotation between the pivot pins and the various surfaces defining the apertures 86, 90 and 92. Further, spacing members 102 may be located between pivot arms 46 and frame members 32 and 34 to maintain the pivot arms properly positioned therebetween. Spacing members 102 may be rigidly secured to frame members 32 and 34; and, with this preferred arrangement, washers 104 are disposed between the spacing members and pivot arms 46, facilitating relative rotation therebetween.

Tube gripping assembly 16 is rotatably supported by arm assembly 14 and is carried by the arm assembly for movement into and out of engagement with a tube located within throat 74. As previously mentioned, tube gripping assembly 16 preferably includes roller pins 50 and tube gripping rollers 52. Roller pins 50 are rotatably supported by pivot arms 46, and gripping rollers 52 are connected to the roller pin for unitary rotation therewith, preferably about an axis perpendicular to the longitudinal axis of a tube passing through throat 74. More specifically, the front portions of pivot arms 46 include parallel, spaced branches 106 and 110, and these branches define aligned apertures 112 and 114 respectively. Gripping rollers 52 define apertures 116; and the gripping rollers are positioned between branches 106 and 110 of pivot arms 46, with apertures 116 aligned with apertures 112 and 114. Roller pins 50 axially extends through aligned apertures 112, 114 and 116, allowing gripping rollers 52 to rotate about the rotational axes defined by the roller pins but limiting radial and tangential movement of the gripping rollers relative to these rotational axes.

Figure 4:
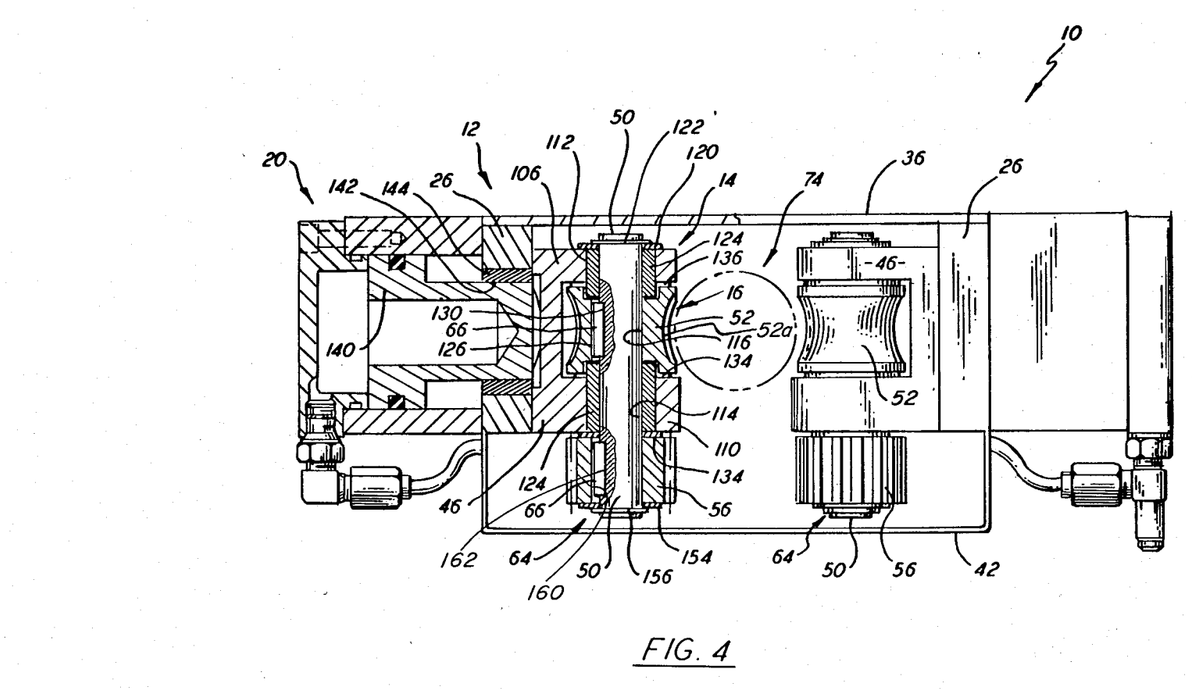
FIGS. 4 and 5 are vertical cross sectional views respectively taken along lines IV—IV and V—V of FIG. 1, illustrating in greater detail the tube gripping assembly, the arm assembly, and the drive assembly of the tube pulling apparatus shown in FIG. 1.
Figure 5:
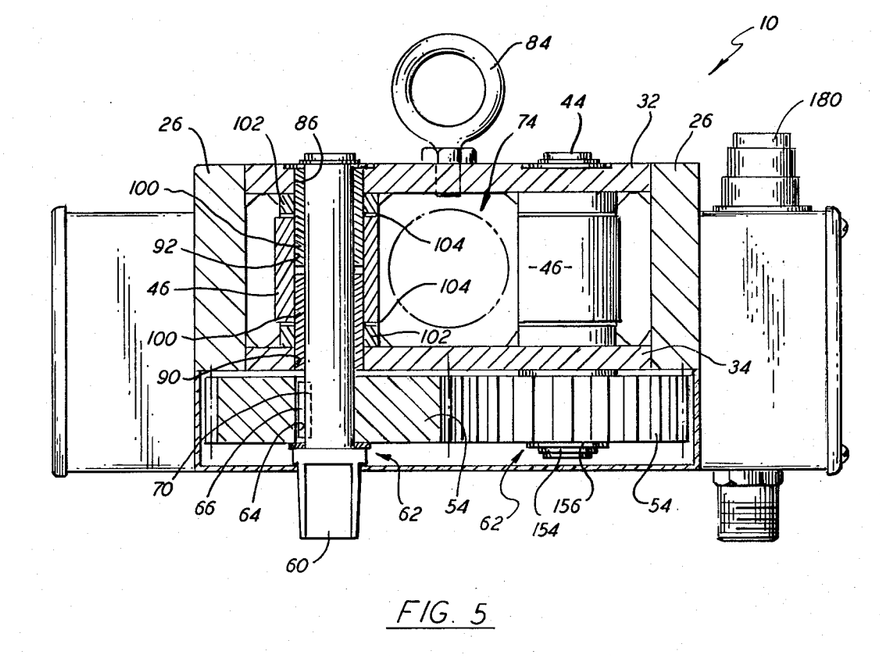

Particularly referring to FIG. 4, roller pins 50 are supported by washers 120 and snap rings 122. Washers 120 encircle upper portions of roller pins 50 and rest on the top surfaces of pivot arms 46, wherein the washers are supported by the pivot arms and may rotate about the axes of the roller pins. Snap rings 122 are fitted into annular grooves defined by upper portions of roller pins 50, extend radially outward therefrom, and rest on washers 120, wherein the snap rings and the roller pins are supported by the washers and may rotate about the axes of the roller pins. Preferably, bushings 124 are located in apertures 112 and 114, radially between the surfaces of pivot arms 46 defining these apertures and roller pins 50 to facilitate or assist relative rotation between the roller pins and the pivot arms.

Referring now to tube gripping rollers 52 in greater detail, the rollers have a generally cylindrical shape, with concave outside surfaces to complement the outside surface of a tube passing through throat 74, and the outside surfaces of the gripping rollers define a plurality of raised threads, discussed in greater detail below. As indicated above, rollers 52 are connected to pins 50 for unitary rotation therewith. More specifically, gripping rollers 52 define axial slots 126 projecting radially outward from apertures 116, and roller pins 50 define axial slots 130 projecting radially inward from the outside annular surfaces of the roller pins. In assembly, slots 126 and 130 are located opposite and aligned with each other, and keys 132 extend into both of these slots, forcing unitary rotation between roller pins 50 and gripping rollers 52. Preferably, gripping rollers 52 are supported by pivot arms 46, for example via bottom washers 134, which are located below the gripping rollers, between and engaging opposed surfaces of the gripping rollers and the pivot arms. Washers 134 also aid relative rotation between gripping rollers 52 and pivot arms 46. Top washers 136 may be disposed above gripping rollers 52, between and engaging opposed surfaces of the gripping rollers and pivot arms 46, securely maintaining the gripping rollers in a stable axial location between branches 106 and 110 of the pivot arms.

Motive means 20 is connected to arm assembly 14 and is provided for moving the arm assembly to move tube gripping assembly 16 into engagement with a tube located within throat 74. The preferred motive means illustrated in the drawings comprises expansible cylinders 20 including pistons 140 engaging arm assembly 14. Preferably, cylinders 20 are secured to frame 12 adjacent the front portion of arm assembly 14, the frame defines piston openings 142, and pistons 140 extend through these openings and engage the front portion of the arm assembly, specifically front portions of pivot arms 46. Any suitable source of pressurized fluid such as hydraulic fluid or pressurized air may be used with cylinders 20. Preferably, though, this source of pressurized fluid is located adjacent to tube pulling apparatus 10 and is connected thereto, specifically to cylinders 20, via flexible conduits or tubes.

It should be pointed out that preferably piston openings 142 are defined by annular piston guides 144, which are secured within complementary openings defined by side members 26 of frame 12. Piston guides 144 closely receive and slidably support first ends of pistons 140, and preferably the piston guides are formed from a material such as bronze presenting low frictional resistance to reciprocating movement of the piston. Also, preferably piston guides 144 are pressure fitted within side members 26 of frame 12 to facilitate removal and replacement of the piston guides should this ever become necessary.

Biasing means 22 is also connected to arm assembly 14 and is provided for urging the arm assembly to move tube gripping assembly 16 out of engagement with a tube located within throat 74. Preferably, biasing means 22 includes a pair of coil springs connected to and extending between portions of pivot arms 46 rearward of pivot pins 44. Springs 22 urge these ends of the pivot arms inward toward each other, and thus urge front ends of the pivot arms outward, away from throat 74. More specifically, the rear or back ends of pivot arms 46 define axial, threaded openings 146, and upper and lower screws 150 and 152 are secured within openings 146. Upper screws 150 secure opposite ends of a first, top spring 22 to top surfaces of pivot arms 46; and lower screws 152 secure opposite ends of a second, bottom spring (not shown) to bottom surfaces of the pivot arms.

As will be apparent to those skilled in the art, numerous other arrangements may be employed to bias arm assembly 14 to move tube gripping assembly 16 away from a tube located within throat 74. For example, air springs or hydraulic springs may be used in lieu of coil springs 22. Also, the biasing means may be located between pivot arms 46 and side members 26 of frame 12, and the biasing means may engage the pivot arms forward of pivot pins 44. For instance, springs may be located between side members 26 and the back ends of pivot arms 46, urging these ends of the pivot arms away from the adjacent side member of frame 12, and thus urging the forward ends of the pivot arms and tube gripping assembly 16 away from throat 74. Alternately, coil springs may be connected to side members 26 of frame 12 and to pivot arms 46 forward of pivot pins 44, pulling the forward ends of the pivot arms toward the adjacent side member 26.

Drive assembly 24 is connected to tube gripping assembly 16 for rotating the tube gripping assembly to pull a tube engaged by the gripping assembly. Referring to the drive assembly 24 illustrated in the drawings, drive gears 54 are supported for rotation about the pivot axes defined by pivot pins 44, driven gears 56 are connected to both the drive gears and tube gripping assembly 16 for transmitting rotary motion therebetween, and connector or adaptor 60 is provided for connecting the drive gears to an external source of power such as an electric motor.

Preferably, gears 54 and 56 comprise toothed wheels concentrically mounted on and supported by pivot pins 44 and roller pins 50 respectively, with gears 54 supported by drive gear support means 62 and gears 56 supported by driven gear support means 64. As will be understood, support means 62 and 64 may take many forms, for example comprising washers 154 and snap rings 156. Washers 154 encircle pins 44 and 50 and project below gears 54 and 56. Snap rings 156 are fitted within annular grooves defined by lower portions of pins 44 and 50 and extend radially outward therefrom, below washers 154, supporting these washers and gears 54 and 56. In addition, preferably driven gears 56 are connected to roller pins 50 for unitary rotation therewith via driven gear keys 66. In particular, driven gears 56 and roller pins 50 define adjacent, aligned axial slots 160 and 162, and keys 66 extend into these slots, forcing unitary rotation between the driven gears and the roller pins and, as a result, tube gripping rollers 52.

Describing adapter 60 in greater detail, the adapter comprises a drive spindle rigidly secured to, and preferably integral with, a first pivot pin 44. The external power source may be connected to spindle 60 in any suitable manner to rotate the spindle and the first pivot pin. With this preferred arrangement, a first drive gear 54 is connected to the first pivot pin 44 for unitary rotation therewith. This may be done, as an example, via slots 164 and 166 and drive gear key 70. More specifically, the first drive gear 54 and the first pivot pin 44 define adjacent, aligned axial slots 164 and 166, and key 70 extends into both of these slots, forcing unitary rotation between the first pivot pin and drive gear. As mentioned immediately above, the external power source may be connected to spindle 60 in any suitable manner, and the power source may be located in any convenient location. For example, the power source may be located adjacent to tube pulling apparatus 10, or the external power source may be directly secured to frame 12.

While the operation of tube pulling apparatus 10 will be apparent from a study of the above remarks, in order to show more fully the advantages and benefits of the present invention, the operation of the tube pulling apparatus will now be described in detail.

Figure 1:
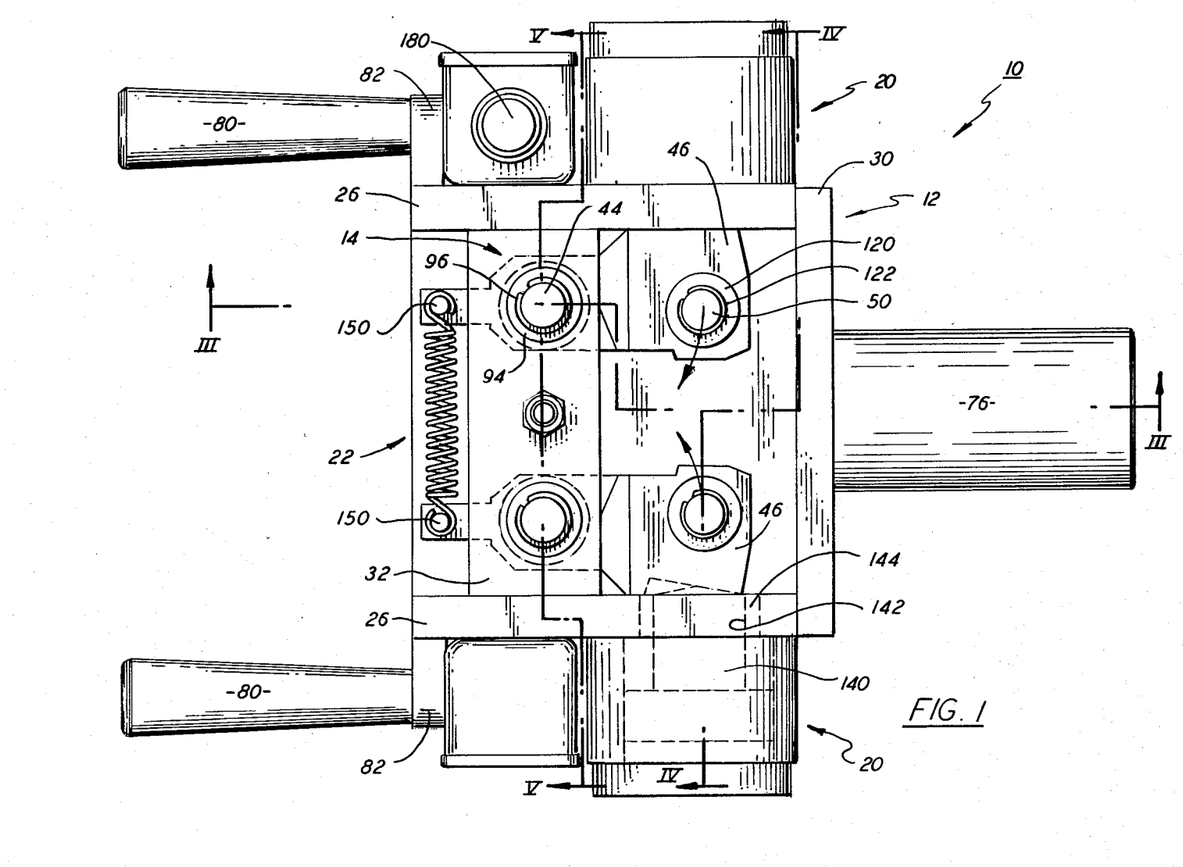
FIG. 1 is a top view of a tube pulling apparatus constructed in accordance with a preferred embodiment of the present invention.
Figure 2:
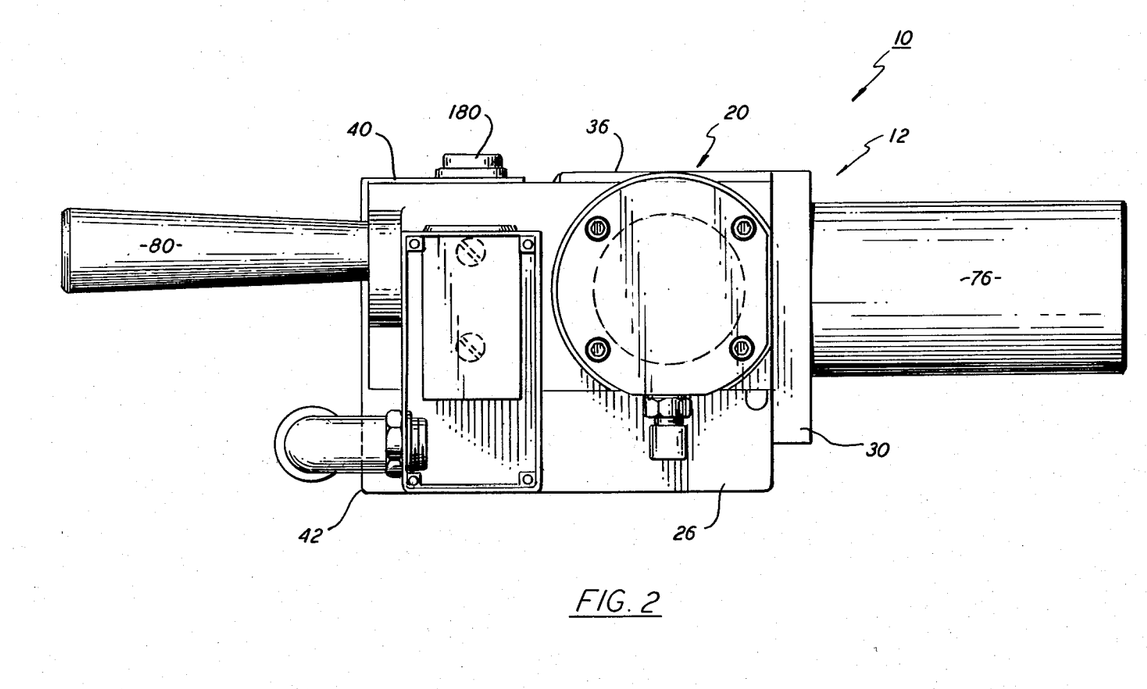
FIG. 2 is a side view of the tube pulling apparatus shown in FIG. 1.
Figure 3:
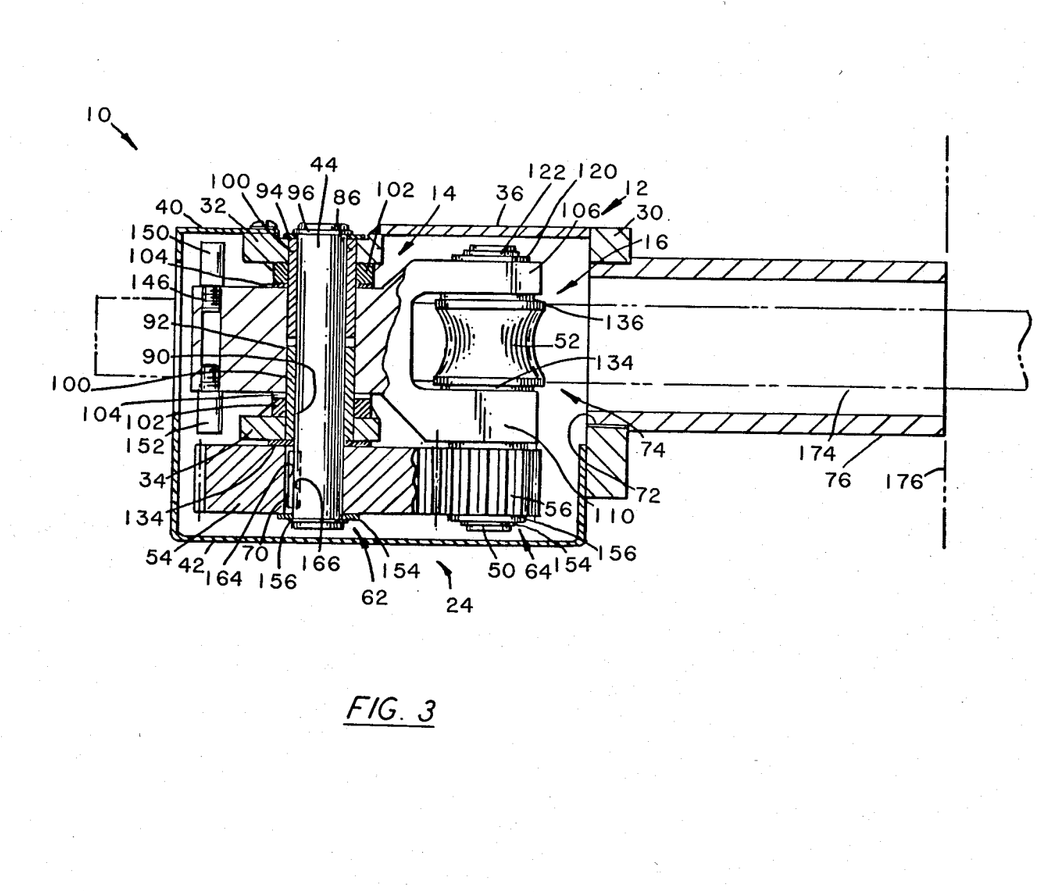
FIG. 3 is a vertical cross sectional view taken along line III—III of FIG. 1.

Referring especially to FIG. 3, to remove tube 174 from tube sheet 176, the pressure forces holding the tube in the tube sheet are first relieved and the tube is partially drawn therefrom. This may be done in any suitable manner, for example as disclosed in U.S. Pat. No. 4,077,102. Once tube 174 is partially drawn from tube sheet 176, tube pulling apparatus 10 is moved into operating position, where nose piece 76 abuts against the tube sheet and encircles the portion of the tube extending outward therefrom. Tube 174, of course, should extend through nose piece 76, through opening 74 defined by front member 30 of frame 12, and at least partially past tube gripping rollers 52. A counterweight may be connected to tube pulling apparatus 10 via a cable and eye bolt 84 to help support the tube pulling apparatus in an operating position.

With tube pulling apparatus 10 properly positioned, pressurized fluid or air is directed into cylinders 20 to move pistons 140 and, hence, the front portions of pivot arms 46 toward tube 174. Pistons 140 are extended until tube gripping rollers 52 engage tube 174 and a satisfactory pressure develops therebetween.

Next, an external power source is connected to adapter 60 of drive assembly 24, and the drive assembly is used to rotate the gripper rollers 52 to pull tube 174 through throat 74. As previously mentioned, the exterior surface of gripping rollers 52 may define a plurality of raised threads or teeth 52a and preferably these threads helically extend along the outside of the gripping rollers to force tube 174 to rotate slowly about its longitudinal axis as the tube is pulled from tube sheet 176. This rotational movement of tube 174 assists pulling the tube through tube sheet 176 by helping to break off, from the exterior surface of the tube, corrosion and other particulates that may accumulate thereon, which otherwise might jam longitudinal movement of the tube.

When tube 174 has been completely pulled through tube sheet 176, drive assembly 24 is deactivated, and the pressurized fluid or air is vented from cylinders 20. The front ends of pivot arms 46 and tube gripping assembly 16, acting under the influence of biasing means 22, pivot away from throat 74, disengaging the tube gripping assembly from tube 174. Tube 174 may then be manually pulled from tube pulling appartus 10, and this apparatus may be moved to another location to pull another tube from tube sheet 176. It should be pointed out that preferably the controls for the pressurized fluid used with cylinders 20 and for the external power source used with drive assembly 24 are located so that they may be easily operated by a worker without requiring that the worker substantially lessen his or her grip on handles 80. For example, the source of pressurized fluid may be controlled by foot pedals located on a floor or ground surface below tube pulling apparatus 10, and the power source for drive assembly 24 may be operated via one or more button switches 180 disposed just above and forward of handles 80.

As will be understood from a brief review of the above discussion, tube pulling apparatus 10 is a relatively simple yet highly efficient and flexible tool having a number of noteworthy features. For example, apparatus 10 automatically clamps tube 174 between tube gripping rollers 52, eliminating the need to clamp the tube by human force. Further, the pressure developed by cylinders 20 may easily be varied, changing the clamping pressure which apparatus 10 may produce. Also, having a comparatively large throat 74, tube pulling apparatus 10 may be used with tubes of various diameters. In addition, because driven gears 56 pivot about the axes of drive gears 54 as tube gripping assembly 16 pivots into and out of engagement with tube 174, the driven gears remain engaged with the drive gears as the tube gripping assembly pivots. This arrangement eliminates the need for any type of clutch or a multitude of intermediate gears to allow relative movement between drive gears 54 and driven gears 56, resulting in a very simple and inexpensive drive assembly.

Moreover, it should be noted that, while the embodiment of tube pulling apparatus 10 described herein in detail comprises arm assembly 14 including two pivot pins 44 and pivot arms 46, tube gripping assembly 16 having two roller pins 50 and tube gripping rollers 52, and drive assembly 24 including two drive gears 54 and driven gears 56, since this produces a very symmetric, strong, and effective apparatus, other arrangements, albeit less preferred, may be used in the practice of the present invention. In particular, with modifications well within the purview of those skilled in the art, arm assembly 14 may include only one pivot pin 44 and one pivot arm 46, tube gripping assembly 16 may have only one roller pin 50 and one gripping roller 52, and drive assembly 24 may comprise one drive gear 54 and one driven gear 56.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A tube pulling apparatus comprising:
   frame means for receiving a tube;
   a pair of arm means each pivotably mounted to, and located within, said frame means;
   a pair of tube gripping means each rotatably supported within one of said pair of arm means at one end thereof and moved by said arm means into and out of engagement with the tube, wherein each of said pair of tube gripping means is of a generally cylindrical shape with a concave outside surface having a plurality of helically extending raised threads extending from said concave surface whereby a tube is rotated as well as moved axially;
   a pair of motive means each engageable with said one end of one of said pair of arm means for moving said one end of each of said arm means to move said pair of tube gripping means into engagement with the tube;
   biasing means connected to the other end of both of said pair of arm means for urging said other ends of said pair of arm means together to thereby tend to move said pair of tube gripping means out of engagement with the tube;
   drive means connected to said pair of tube gripping means for rotating said pair of tube gripping means to thereby pull the tube;

each of said pair of arm means includes a pivot pin supported by said frame means and defining a pivot axis;

a pivot arm supported for pivotal movement about said pivot axis;

said drive means includes a pair of drive gears supported for rotation about each of said pivot axes; and a pair of driven gears each connected to both of one of said drive gears and one of said tube gripping means for transmitting rotary motion therebetween.

2. A tube pulling apparatus as defined by claim 1 wherein each of said pair of tube gripping means includes:

a roller pin rotatably supported by the pivot arm;

a gripping roller connected to the roller pin for unitary rotation therewith; and means connecting the roller pin to the driven gear for unitary rotation therewith.

3. A tube pulling apparatus as defined by claim 2 wherein said drive means further includes:

means secured to each of said pivot pins and supporting said drive gears; and means secured to each of said roller pins and supporting said said pair of driven gears.

* * * * *